US009069492B2

(12) United States Patent
Jintsugawa

(10) Patent No.: US 9,069,492 B2
(45) Date of Patent: Jun. 30, 2015

(54) CONTROL SYSTEMS FOR REPETITIVE PRINTING

(71) Applicant: Seiko Epson Corporation, Tokyo (JP)

(72) Inventor: Kei Jintsugawa, Matsumoto (JP)

(73) Assignee: Seiko Epson Corporation, Suwa-shi (JP)

( * ) Notice: Subject to any disclaimer, the term of this patent is extended or adjusted under 35 U.S.C. 154(b) by 0 days.

(21) Appl. No.: 14/285,203

(22) Filed: May 22, 2014

(65) Prior Publication Data

US 2014/0347687 A1    Nov. 27, 2014

(30) Foreign Application Priority Data

May 22, 2013  (JP) .................................. 2013-107949
Mar. 6, 2014  (JP) .................................. 2014-044069

(51) Int. Cl.
*G06F 3/12* (2006.01)
*G06K 15/02* (2006.01)
*B41J 3/407* (2006.01)

(52) U.S. Cl.
CPC ................. *G06F 3/12* (2013.01); *B41J 3/4075* (2013.01); *G06K 15/024* (2013.01); *G06K 15/181* (2013.01); *G06K 15/1893* (2013.01)

(58) Field of Classification Search
USPC ................................................. 358/1.1–3.29
See application file for complete search history.

(56) References Cited

U.S. PATENT DOCUMENTS

| 7,202,972 | B1 * | 4/2007 | Schwier et al. ................. 358/1.9 |
| 7,839,516 | B2 * | 11/2010 | Tomita et al. ................. 358/1.15 |
| 2003/0116915 | A1 * | 6/2003 | Rapp .............................. 273/292 |
| 2004/0145755 | A1 * | 7/2004 | Ishiguro ......................... 358/1.1 |
| 2010/0134841 | A1 * | 6/2010 | Petz .............................. 358/1.15 |

FOREIGN PATENT DOCUMENTS

| JP | 07-211409 A | 8/1995 |
| JP | 2000-099300 A | 4/2000 |
| JP | 2003-039767 A | 2/2003 |
| JP | 2007-136913 A | 6/2007 |

* cited by examiner

*Primary Examiner* — Marcellus Augustin
(74) *Attorney, Agent, or Firm* — Nutter McClennen & Fish LLP; John J. Penny, Jr.; Megan E. Jeans

(57) ABSTRACT

Complicating programs installed on a control device, and wasting recording media, are suppressed. A registration device driver that generates and outputs control commands instructing registering a static image in an inkjet printer based on input of information related to a static image from an application AP, and a device control driver that generates and outputs a control command to print the static image registered in the inkjet printer superimposed with the variable image based on input of information related to the variable image from an application, are installed on a host computer. An application calls the device driver appropriate to the process.

10 Claims, 9 Drawing Sheets

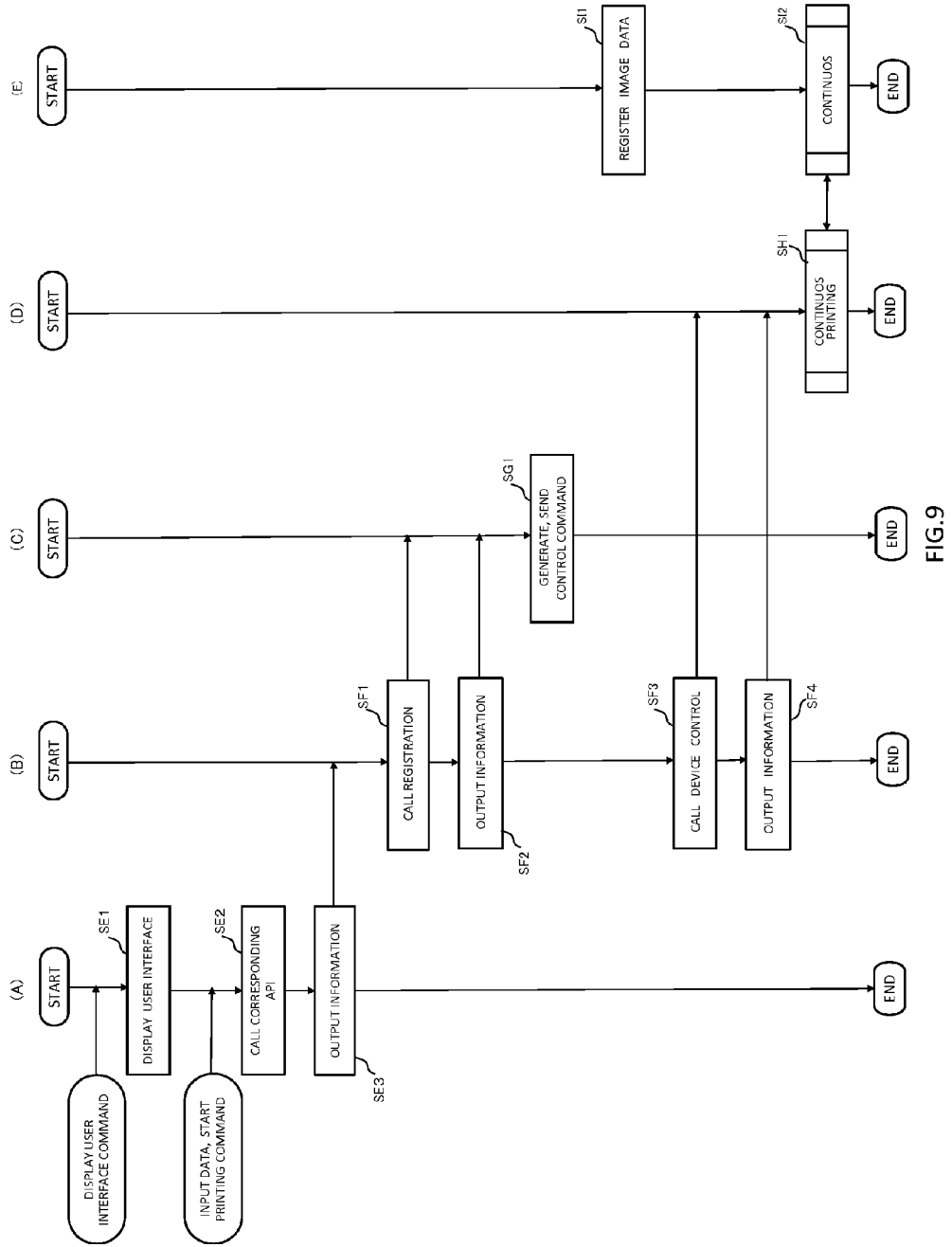

CONTROL SYSTEMS FOR REPETITIVE PRINTING

Priority is claimed under 35 U.S.C. §119 from Japanese patent application nos. JP 2013-107949 filed on May 22, 2013 and JP 2014-044069 filed on Mar. 6, 2014, which are hereby incorporated by reference in their entirety.

BACKGROUND

1. Technical Field

The present disclosure relates to a control device that connects to a printer capable of printing labels repeatedly, and to a control system including the control device and the printer.

2. Related Art

Printing devices (label printers) that repeatedly print images on recording media while conveying the recording medium (label paper) are known from the literature. See, for example, JP-A-2007-136913.

One type of recording medium commonly used in such printers is label paper having multiple labels of a specific size affixed with a constant gap therebetween to a continuous liner. The printer repeatedly prints images on consecutive labels. The label paper may also be preprinted with a static image (such as an image forming a border on the label) that is the same on each label.

When using label paper with a fixed imaged preprinted on each label, label paper that was already produced with the fixed image may be wasted when the fixed image is changed due to a design change, for example. The label paper may also be frequently replaced in order to print different labels preprinted with a different static image.

The printer is also usually connected to a control device, and repeatedly prints images to the recording medium as controlled by the control device. A program that generates control commands conforming to the command language of the printer is also installed on the control device, and the control device controls the printer using a function of the program.

Suppressing the complexity of the program that gets installed to the control device is also desirable.

SUMMARY

At least one embodiment of the present invention suppresses waste and the need to replace the recording medium, and suppresses complicating the program installed to the control device.

One aspect of at least one embodiment of the present invention is a control device connected to a printing device capable of repeatedly printing an image on recording media. The image includes a variable image that can be changed in each repeatedly printed image, and a static image that is the same in each repeatedly printed image. The control device includes a registration device driver execution unit that runs a registration device driver with the ability to instruct registering the static image on the printing device; and a device control driver execution unit that runs a device control driver with the ability to instruct printing the variable image superimposed with the static image registered in the printing device. The registration device driver execution unit generates and outputs to the printing device a control command instructing registering the static image based on input of information related to the static image, and the device control driver execution unit generates and outputs to the printing device a control command instructing printing the variable image superimposed with the static image registered in the printing device based on input of information related to the variable image.

In this aspect of the invention, the control device can repeatedly send information related to the variable image to the printing device after registering the static image in the printing device, superimpose the registered static image with each variable image, and print label images continuously. As a result, there is no need to preprint label paper or other recording medium with a static image, recording media is not destroyed when there is a design change in the static image, for example, and recording media waste can be suppressed. The need to frequently replace the recording medium can also be suppressed.

The control device in this configuration also has a registration device driver execution unit that executes a process related to registering the static image by a function of the registration device driver, and a device control driver execution unit that executes a process related to controlling image printing by a function of the device control driver.

A configuration in which the function for registering a static image and the function controlling printing are both embodied in a single device driver is conceivable. In this event, the device driver must be configured so that either function can be selectively executed by changing the mode, and the application or other program that calls the device driver must be configured so that the device driver mode can be changed by applying an appropriate command to the device driver. As a result, the program that calls the device driver must be specifically programmed according to the specifications of the device driver, and the device driver must be programmed specifically for the application. In other words, programming becomes increasingly complex.

In this aspect of the invention, the control device can simply call the registration device driver to register a static image, and call the device control driver to print. More specifically, by changing the device driver that is called, a static image can be registered and images printed while not complicating programming.

In a control device according to another aspect of at least one embodiment of the present invention, the registration device driver execution unit generates and outputs a control command instructing registering the static image in the printing device based on input of information related to the static image from a specific program; and the device control driver execution unit generates and outputs to the printing device a control command instructing printing the variable image superimposed with the static image registered in the printing device based on input of information related to the variable image from the specific program.

This aspect of the invention prevents complicating a specific program.

In another aspect of at least one embodiment of the present invention, the specific program is an application capable of outputting information related to an image to print on a recording medium.

This aspect of the invention prevents complicating the application.

In another aspect of at least one embodiment of the present invention, the specific program is an application programming interface (API) that is called by an application and handles data input/output between the application and a device driver.

This aspect of the invention prevents complicating the API.

When the control device repeatedly prints the image on the recording medium in another aspect of at least one embodiment of the present invention, the registration device driver execution unit is called by the specific program, and generates and outputs to the printing device a control command instructing registering the static image in the printing device based on input of information related to the static image from the specific program; and the device control driver execution unit is called by the specific program, and generates and outputs to the printing device a control command instructing printing the variable image superimposed with the static image registered in the printing device based on input of information related to the variable image from the specific program.

In this aspect of the invention, the registration device driver and the device control driver cooperate without human intervention and can automatically register the static image and repeatedly print label images using the registered static image, and user convenience is excellent.

In a control device according to another aspect of at least one embodiment of the present invention, the control device provides a user interface to select the registration device driver and the device control driver when repeatedly printing images on the recording medium.

This aspect of the invention enables accurately identifying the registration device driver and device control driver for the application.

Another aspect of at least one embodiment of the present invention is a control system comprising a printing device capable of repeatedly printing an image on recording media, and a control device connected to the printing device, wherein: the image includes a variable image that can be changed in each repeatedly printed image, and a static image that is the same in each repeatedly printed image; the control device includes a registration device driver execution unit that runs a registration device driver with the ability to instruct registering the static image on the printing device, and generates and outputs to the printing device a control command instructing registering the static image based on input of information related to the static image, and a device control driver execution unit that runs a device control driver with the ability to instruct printing the variable image superimposed with the static image registered in the printing device, and generates and outputs to the printing device a control command instructing printing the variable image superimposed with the static image registered in the printing device based on input of information related to the variable image; and the printing device includes a control unit that registers the static image based on a control command instructing registering the static image, and prints the registered static image superimposed with the variable image on the recording medium when a control command instructing printing the static image superimposed with the variable image is received.

This aspect of the invention can reduce recording media waste, reduce replacing the recording medium, and prevent complicating programming.

In a control system according to another aspect of at least one embodiment of the present invention, the registration device driver execution unit generates and outputs a control command instructing registering the static image in the printing device based on input of information related to the static image from a specific program; and the device control driver execution unit generates and outputs to the printing device a control command instructing printing the variable image superimposed with the static image registered in the printing device based on input of information related to the variable image from the specific program.

This aspect of the invention prevents complicating a specific program.

BRIEF DESCRIPTION OF THE DRAWINGS

FIG. 9 is a flow chart describing the operation of the host computer in another embodiment.

DESCRIPTION OF EMBODIMENTS

Some embodiments of the present invention are described below with reference to the accompanying figures.

Figure 1:
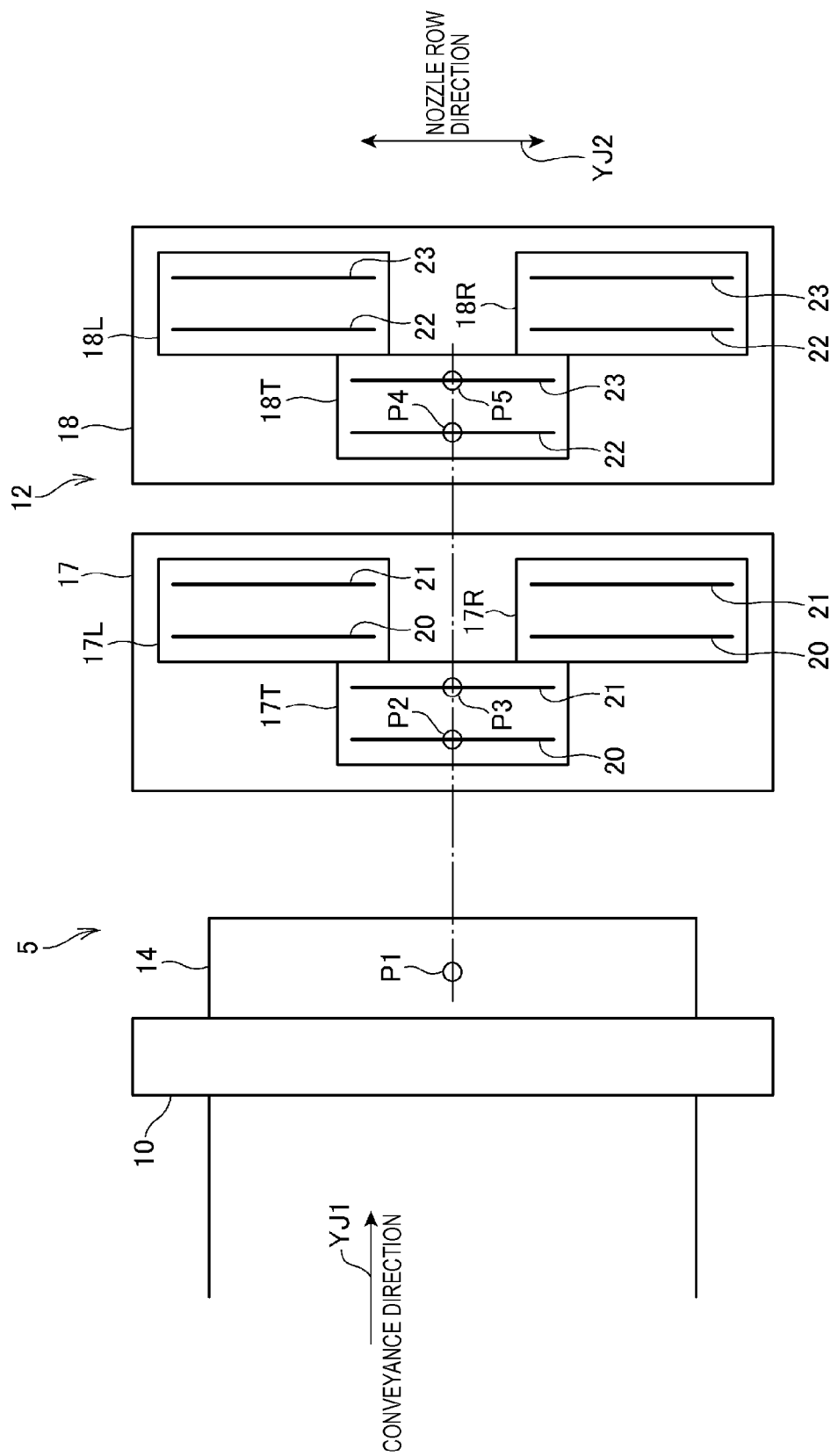
FIG. 1 illustrates the configuration of an inkjet printer according to some embodiments.

FIG. 1 describes the basic configuration of an inkjet printer 5 (printing device) connected to a host computer 1 (control device, see FIG. 3) according to some embodiments of the invention.

The inkjet printer 5 is an inkjet printer that prints images on label paper 14 by ejecting ink from an inkjet head 12 onto the label paper 14 while conveying the label paper 14 (recording medium) in the forward feed direction YJ1 (conveyance direction) by a conveyance roller 10.

The inkjet printer 5 can at least record images on label paper 14 used as an example of the recording medium.

Figure 2:
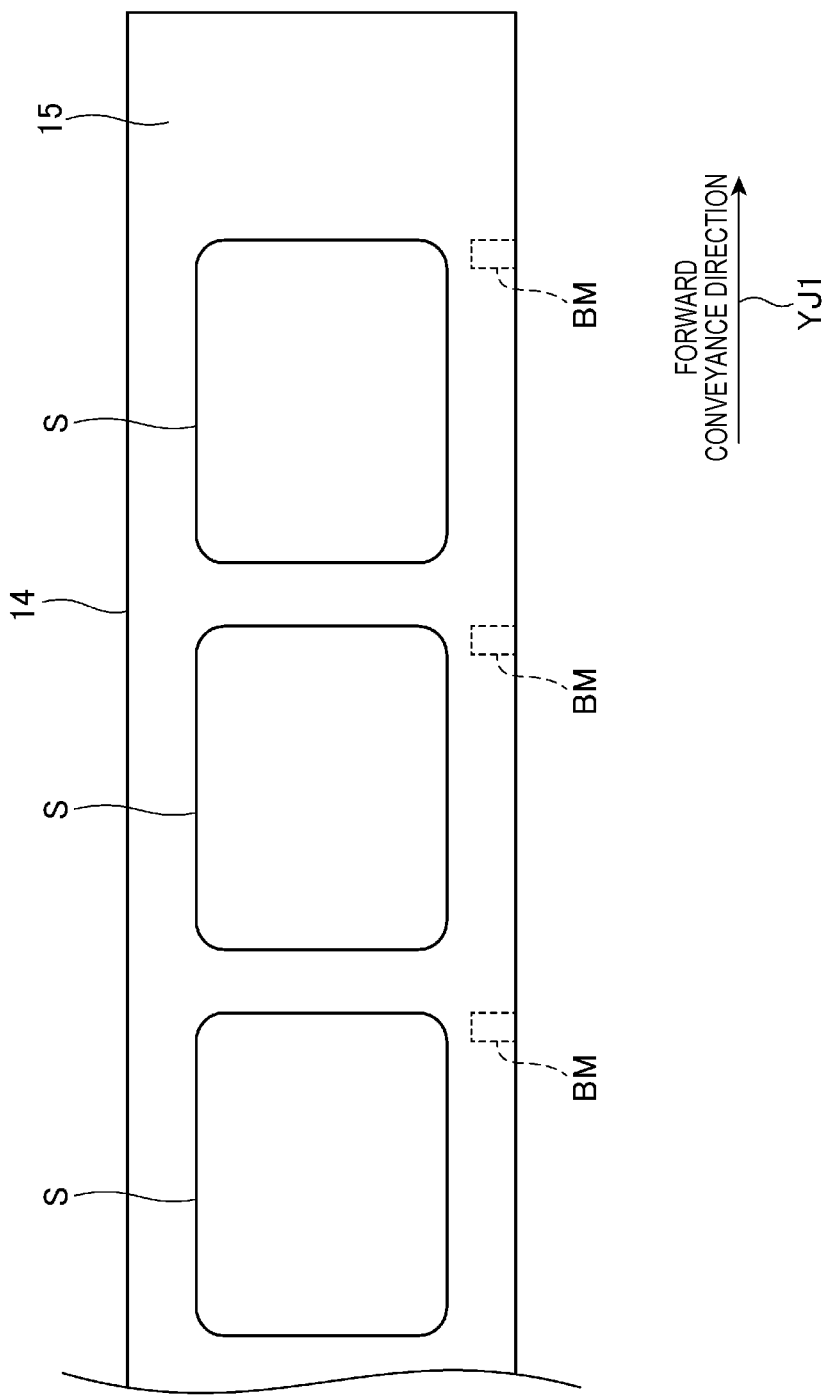
FIG. 2 illustrates an example of label paper.

FIG. 2 schematically describes the label paper 14.

As shown in FIG. 2, the label paper 14 is a continuous sheet with multiple labels S affixed with a specific gap therebetween on the printing side 15 of the liner. The part corresponding to each label S is an adhesive seal, and can be peeled along its edges from the liner. The length of each label S along the length of the liner is constant, and the gap between each label S is also constant. As described below, the inkjet printer 5 prints an image in each of the labels S affixed to the label paper 14.

When the inkjet printer 5 prints on the label paper 14, the label paper 14 is set in the inkjet printer 5 so that the length of the label paper 14 is aligned with the forward conveyance direction YJ1, and specific images are appropriately printed on the labels S as the label paper 14 is conveyed in the forward conveyance direction YJ1.

As shown in FIG. 2, a black mark BM is formed on the back side of the label paper 14 at reference positions corresponding to the labels S. While not shown in FIG. 1, a black mark sensor 42 (FIG. 3) that optically detects the black marks BM formed on the conveyed label paper 14 is disposed to a specific position on the label paper 14 conveyance path in the inkjet printer 5. Based on the output of the black mark sensor 42, the inkjet printer 5 detects when a black mark BM reaches the position of the sensor. The inkjet printer 5 also adjusts the position of the label paper 14 and adjusts the media conveyance process based on sensor output.

As shown in FIG. 1, the inkjet printer 5 is an inkjet line printer and has an upstream head unit 17 and a downstream head unit 18.

The upstream head unit 17 has three staggered printheads, upstream top printhead 17T, upstream left printhead 17L, and upstream right printhead 17R. The downstream head unit 18 similarly has three staggered recording heads, downstream top printhead 18T, downstream left printhead 18L, and downstream right printhead 18R.

A black nozzle row 20, and a cyan nozzle row 21 disposed downstream from the black nozzle row 20, are disposed to the upstream top printhead 17T.

The black nozzle row 20 is a nozzle row having nozzles (not shown) that eject ink as fine ink droplets formed in the nozzle row direction YJ2, which is perpendicular to the forward conveyance direction YJ1. Ink is supplied to the black nozzle row 20 from a black (K) ink cartridge (not shown). The upstream top printhead 17T pushes ink supplied from the black (K) ink cartridge by an actuator such as a piezoelectric device toward the label paper 14, ejecting fine ink droplets from specific nozzles.

Similarly to the black nozzle row 20, the cyan nozzle row 21 is a nozzle row of nozzles formed in the nozzle row direction, and has ink supplied from a cyan (C) ink cartridge (not shown).

The upstream right printhead 17R and the upstream left printhead 17L are configured identically to the upstream top printhead 17T, and each has a black nozzle row 20, and a cyan nozzle row 21 disposed on the downstream side of the black nozzle row 20.

A magenta nozzle row 22, and a yellow nozzle row 23 located downstream from the magenta nozzle row 22, are disposed to the downstream top printhead 18T.

Like the black nozzle row 20, the magenta nozzle row 22 is a row of nozzles formed in the nozzle row direction, and has ink supplied from a magenta (M) ink cartridge (not shown).

Like the black nozzle row 20, the yellow nozzle row 23 is also a row of nozzles formed in the nozzle row direction, and has ink supplied from a yellow (Y) ink cartridge (not shown).

The downstream right printhead 18R and downstream left printhead 18L are configured identically to the downstream top printhead 18T, and each has a magenta nozzle row 22 and a yellow nozzle row 23 disposed on the downstream side of the magenta nozzle row 22.

Note that the printheads and the nozzle rows of the recording heads are shown in FIG. 1 for convenience of description, but the recording heads are actually configured to eject ink vertically downward from the nozzles of the nozzle rows, and other parts enabling this operation are also disposed.

The inkjet printer 5 ejects ink and forms dots on the label paper 14, and prints images by the combination of dots. The basic operation forming a single dot on the label paper 14 is described below using FIG. 1.

Forming a dot of a specific color at a desired position P1 on the label paper 14 when the label paper 14 is set to the position shown in FIG. 1 is described below. The specific color in this example is a color that is produced by ejecting specific amounts of black (K), cyan (C), magenta (M), and yellow (Y) ink. Position P2 in the inkjet printer 5 is the position where position P1 on the conveyed recording medium passes the black nozzle row 20 of the upstream top printhead 17T. Position P3, position P4, and position P5 are similar positions.

The inkjet printer 5 conveys the label paper 14 in the forward conveyance direction YJ1 at a substantially constant speed while forming dots on the label paper 14. Conveyance of the label paper 14 in the forward conveyance direction YJ1 proceeds from the position shown in FIG. 1, and the inkjet printer 5 ejects a specific amount of black (K) ink from the nozzle corresponding to position P2 timed to position P1 on the label paper 14 reaching the position corresponding to position P2. The inkjet printer 5 likewise ejects a specific amount of cyan (C) ink from the nozzle corresponding to position P3 timed to position P1 on the label paper 14 reaching the position corresponding to position P3; ejects a specific amount of magenta (M) ink from the nozzle corresponding to position P4 timed to position P1 on the label paper 14 reaching the position corresponding to position P4; and ejects a specific amount of yellow (Y) ink from the nozzle corresponding to position P5 timed to position P1 on the label paper 14 reaching the position corresponding to position P5.

Specific amounts of black (K), cyan (C), magenta (M), and yellow (Y) ink are thus ejected to position P1 on the label paper 14, and a dot of a specific color is formed at position P1.

With a inkjet printer 5 according to some embodiments of the invention, the position of the inkjet line head 12 is fixed during the image printing process, the label paper 14 moves at a constant speed relative to the stationary inkjet line head 12, ink is desirably ejected from the inkjet line head 12 to form dots, and an image is printed.

Figure 3:
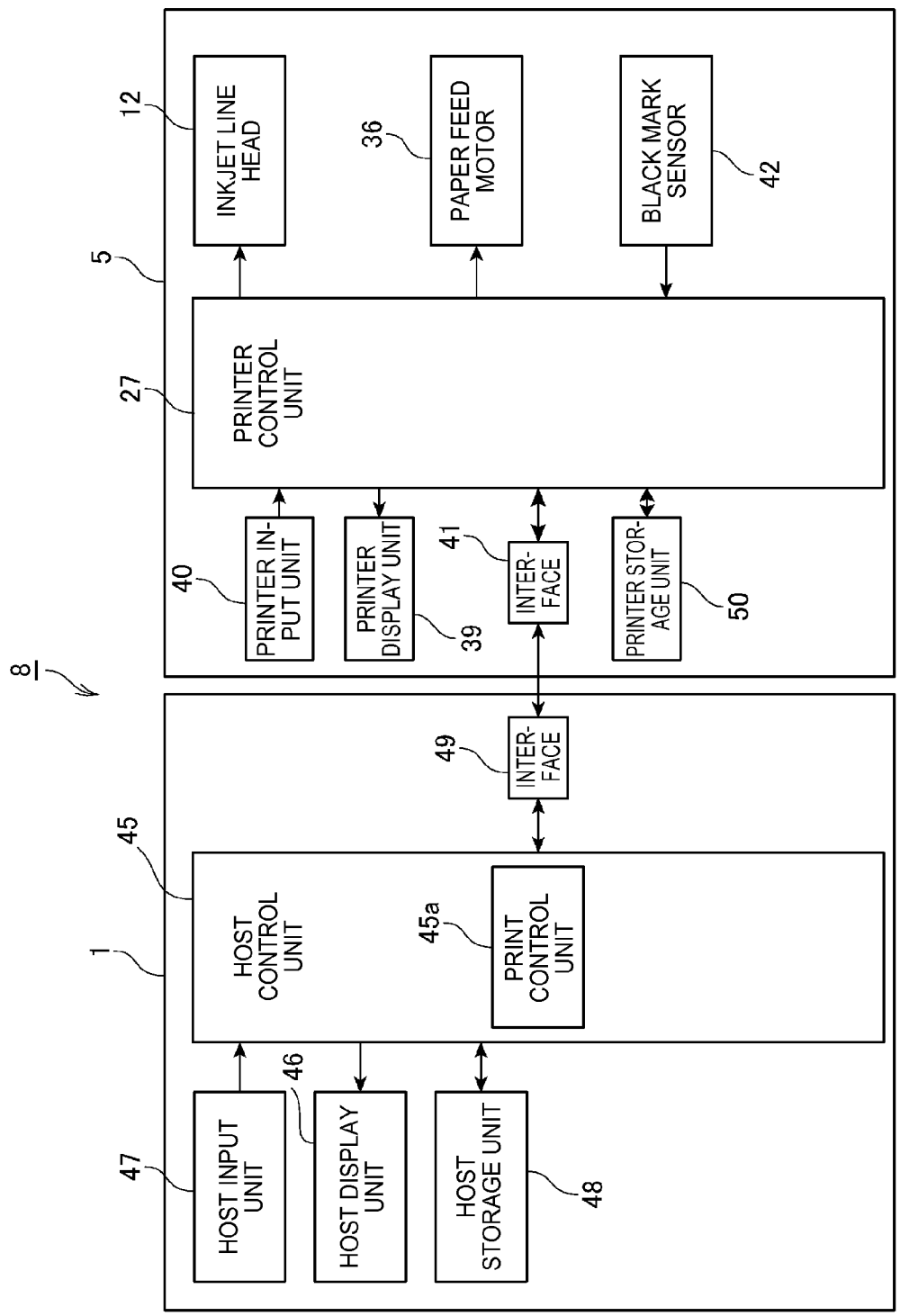
FIG. 3 is a block diagram showing the functional configuration of a host computer and an inkjet printer.

FIG. 3 schematically shows the functional configuration of a printing system 8 (control system) according to some embodiments of the invention.

As shown in FIG. 3, the printing system 8 includes an inkjet printer 5, and a host computer 1 (control device) that can connect to the inkjet printer 5 and controls the inkjet printer 5.

The printer control unit 27 (control unit) of the inkjet printer 5 controls other parts of the inkjet printer 5, and includes a CPU as an operating unit, firmware that can be run by the CPU, ROM that nonvolatilely stores data related to the firmware, RAM that temporarily stores the firmware executed by the CPU and data related to the firmware, and other peripheral circuits.

The printer control unit 27 prints an image on the label paper 14 by driving the actuators of the inkjet head units of the inkjet line head 12 and ejecting the required amount of ink from each of the appropriate nozzles. The printer control unit 27 also drives a paper feed motor 36 for driving the conveyance roller 10, and moves the label paper 14 a specific amount. The conveyance roller 10 turns as the paper feed motor 36 is driven, and the recording medium is conveyed a specific amount in the forward conveyance direction YJ1.

The paper feed motor 36 is a stepper motor, and the printer control unit 27 can precisely control the paper feed distance based on the number of steps the paper feed motor 36 is driven.

A black mark sensor 42 optically reads the black marks BM formed on the label paper 14 conveyed through the conveyance path, and outputs the detected result to the printer control unit 27. The display unit 39 has multiple LEDs, and turns specific LEDs on/off in specific patterns as controlled by the printer control unit 27 to report inkjet printer 5 status information, or to report if an error occurred.

The printer input unit 40 is connected to operating switches disposed to the inkjet printer 5, detects operation of the switches, and outputs to the printer control unit 27. The image buffer 50 includes EEPROM, a hard disk drive, or other nonvolatile memory, and nonvolatilely stores data rewritably. A communication interface 41 communicates with the host computer 1 according to a specific protocol as controlled by the printer control unit 27.

As shown in FIG. 3, the host computer 1 has a host control unit 45 that controls other parts of the host computer 1. The host control unit 45 has a print control unit 45*a*, and the print control unit 45*a* includes a registration device driver execution unit 45*b* and a device control driver execution unit 45*c* as further described below.

The host computer 1 also has a host display unit 46 for displaying information, a host input unit 47 for detecting operation of the connected input devices, a host storage unit 48 for storing data, and a communication interface 49 for communicating with the inkjet printer 5.

Images can be repeatedly printed to the labels S of the label paper 14 in the printing system 8 according to this embodiment. Printing images on the labels S of the label paper 14 is described more specifically below.

Figure 4A:
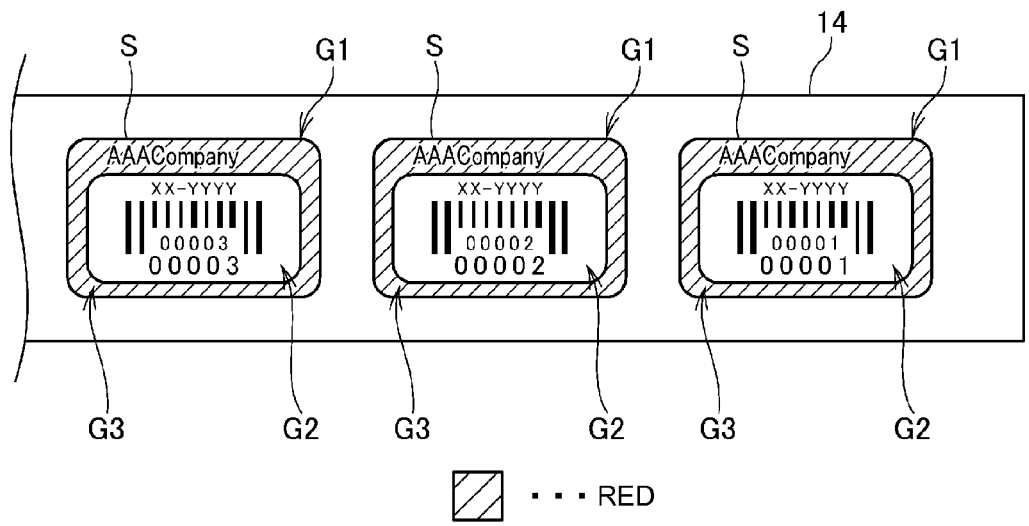
FIG. 4A shows an example of a label image printed on a label of the label paper.

FIG. 4A shows an example of images (label images) printed on the labels S of the label paper 14 in the printing system 8 according to this embodiment. In the example described below, the printing system 8 is used for on-site printing of labels in a factory that produces televisions as an example of a product. The labels S in this example are affixed to the television (product), or the packaging of the television (product packaging), after being peeled from the liner.

As shown in FIG. 4A, a label image G1 is printed on each label S.

Each label image G1 includes a variable image G2 that may differ in each label image G1, and a static image G3 that is the same in every label image G1.

In the example in FIG. 4A, the static image G3 is an image of a red border printed along the outside edge of the label S. The name of the television manufacturer, AAA Company in this example, is printed at a position along the top border of the label S. As shown in the example in FIG. 4A, the static image G3 printed on each label S is the same.

The variable image G2 is an image printed in the area surround by the border created by the static image G3. The variable image G2 includes a string (XX-YYYY in the example in FIG. 4) identifying the model of television, a barcode representing a code assigned uniquely to each television, and a string (a five digit number in the example in FIG. 4) representing an identification number uniquely assigned to each television. The printed barcode and identification number are different in each variable image G2. The content of the variable image G2 is therefore different in each label image G1.

Figure 4B:
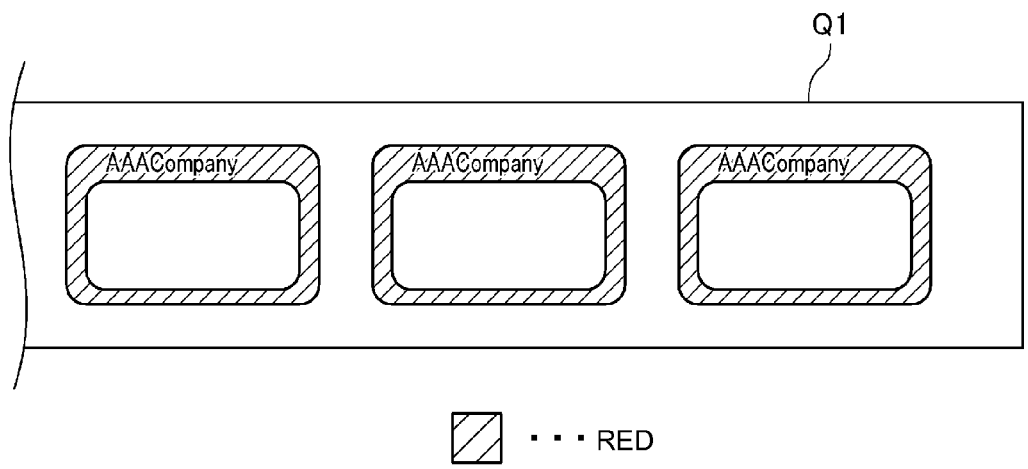
FIG. 4B shows an example of conventional label paper.

Label paper Q1 as shown in FIG. 4B is used in the conventional system to produce labels S with a label image G1 including the variable image G2 and the static image G3.

As shown in FIG. 4B, the static image G3 is preprinted to the labels S on the conventional label paper Q1. The conventional printer produces the label image G1 including the static image G3 and variable image G2 on each label S by simply printing the variable image G2 on each label S.

The following problems can occur in this event. Specifically, the static image G3 is preprinted on the label paper Q1. As a result, when the design of the static image G3 changes, label paper Q1 that was printed with the static image G3 used before the design change may be wasted. Alternatively, the label paper may need to be frequently replaced depending upon the labels to be printed.

The printing system 8 according to some embodiments of the invention solves this problem of the related art by executing the process described below with the configuration described below. More particularly, the printing system 8 according to some embodiments of the invention solves the problem of the related art without complicating the application AP (described below) and the device driver (described below) programs.

Figure 5:
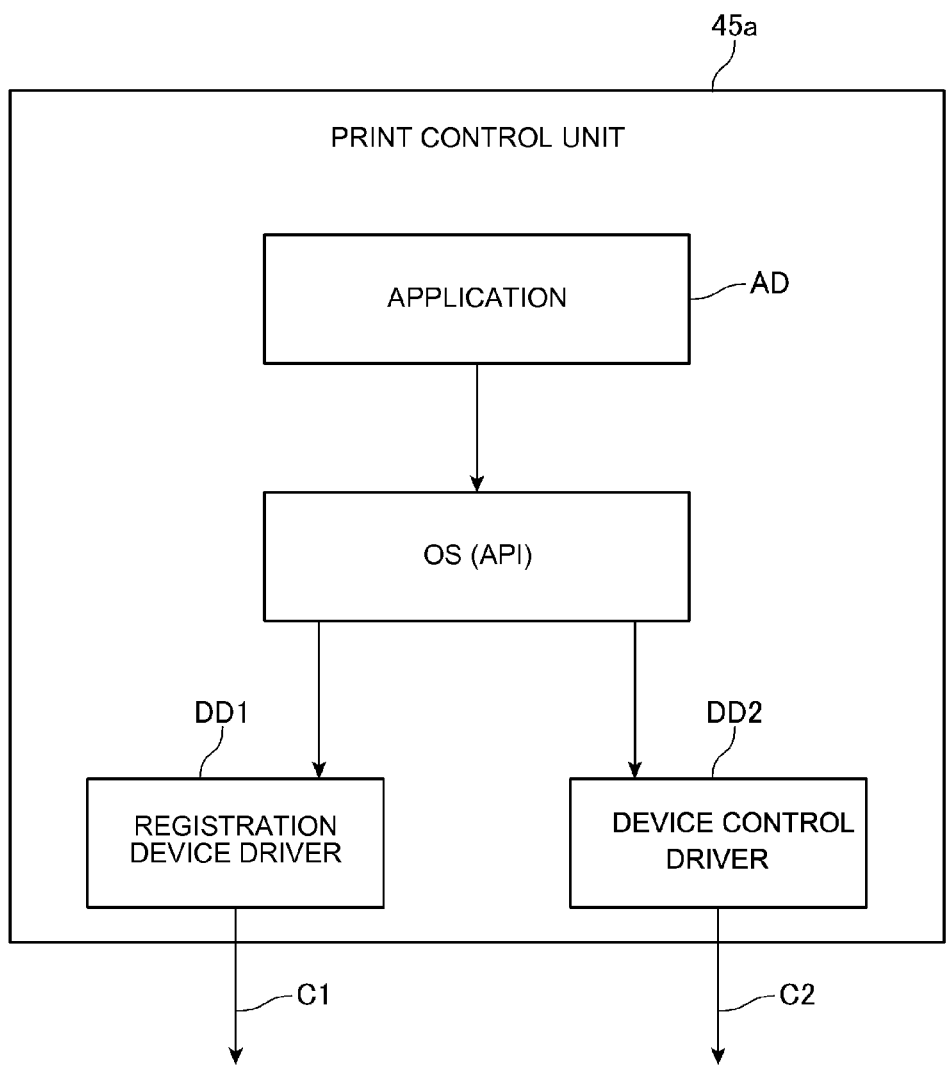
FIG. 5 shows the software configuration of the print control unit.

FIG. 5 illustrates the software architecture of the print control unit 45a in the host control unit 45 of the host computer 1. More specifically, the function of the print control unit 45a is achieved by a CPU reading and running the programs (including associated programs) indicated by the blocks in FIG. 5.

The application AP is a program with a function for outputting information related to images printed on the recording medium (label paper 14 in this embodiment) by the inkjet printer 5.

As shown in FIG. 5, two device drivers, a registration device driver DD1 and a device control driver DD2, are installed on the host computer 1. These device drivers are separate, independent device drivers. More specifically, individual identification information is assigned with reference to the operating system (OS) to each device driver as identification information for recognizing the device driver. The application AP can call the device drivers using an API (Application Programming Interface) provided by the OS. Either registration device driver DD1 or device control driver DD2 can be selectively called when calling a device driver. Note that the API can be provided by the OS, or a dedicated API with this function could be used.

The function of each device driver, and the effect of using two device drivers, are described below.

The registration device driver execution unit 45b is a function block that executes processes by reading and running the registration device driver DD1. The device control driver execution unit 45c is a function block that executes processes by reading and running the device control driver DD2.

The application execution unit 45d is a function block that executes processes by reading and running the application AP.

Figure 6:
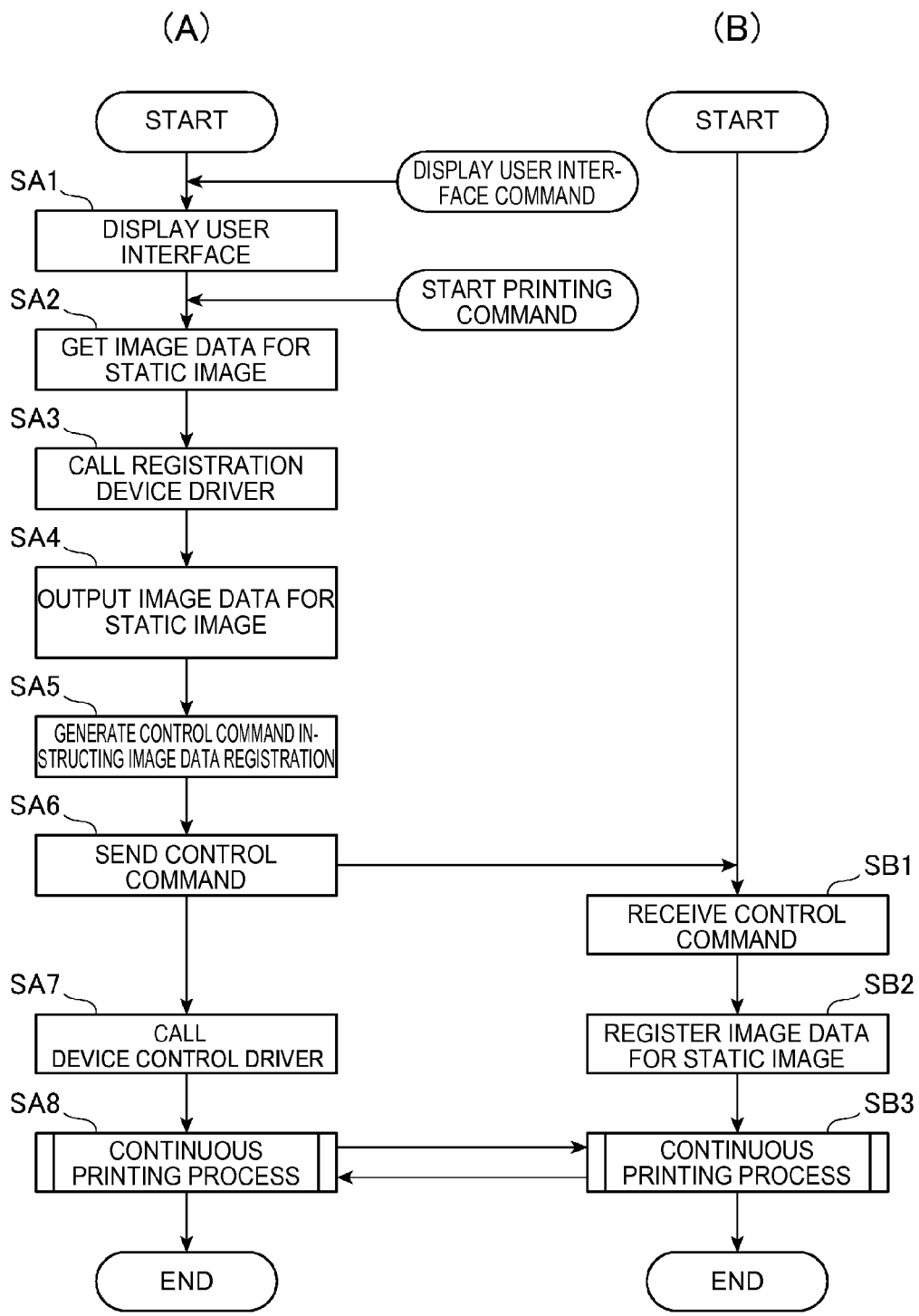
FIG. 6 is a flow chart describing the operation of the host computer and the inkjet printer when printing a label image.

FIG. 6 is a flow chart illustrating the operation of the host computer 1 and the inkjet printer 5 when repeatedly printing label images G1 on the label paper 14. The operation of the host computer 1 is shown in column (A), and the operation of the inkjet printer 5 in (B).

To print the label image G1 on the labels S of the label paper 14 with the printing system 8, the user first instructs displaying the dedicated user interface UI. In response to this command, the application execution unit 45d of the host control unit 45 of the host computer 1 displays the user interface UI on the display panel (step SA1).

Figure 7:
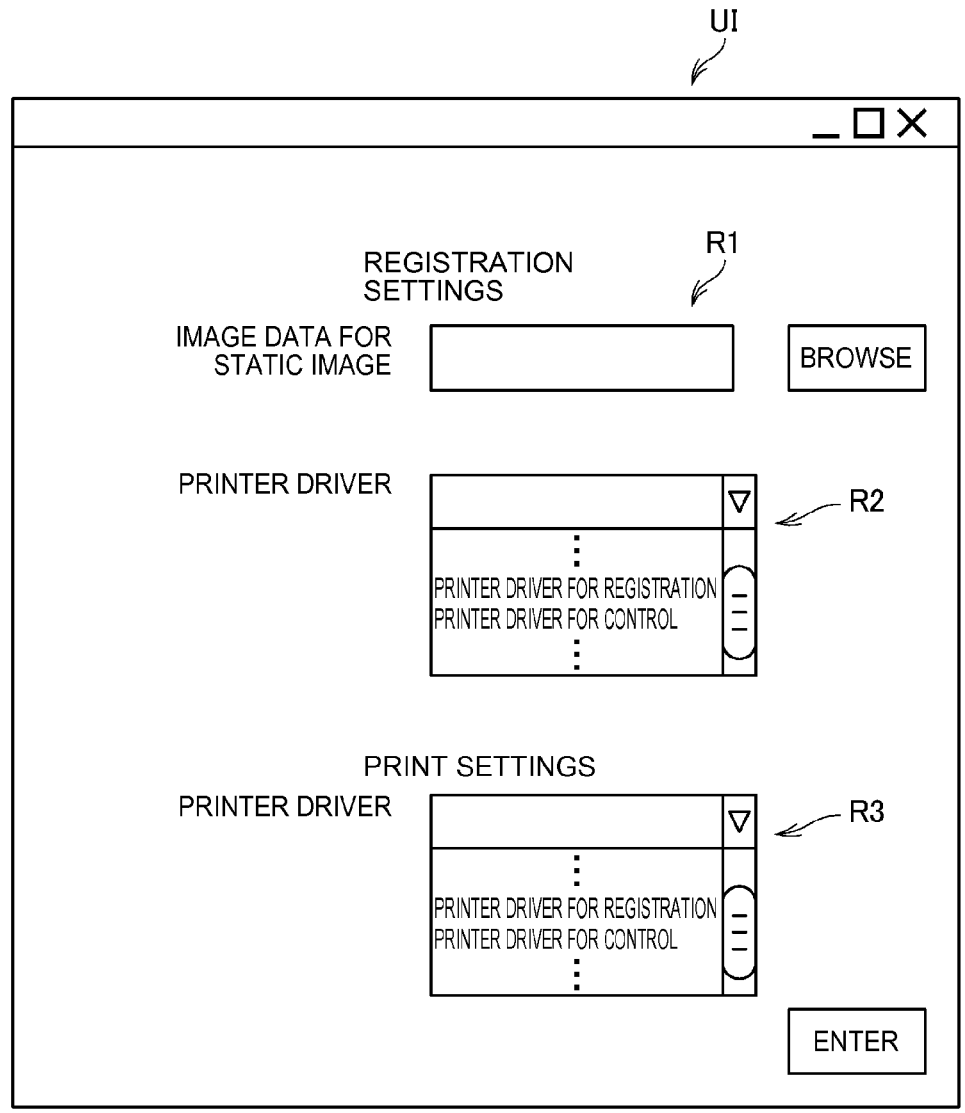
FIG. 7 shows an example of a user interface.

FIG. 7 shows an example of a user interface UI. This user interface UI is a user interface enabling the user to input to the printing system 8 the information required to register image data for the static image G3 in the inkjet printer 5, and to print the label image G1.

As shown in FIG. 7, the user interface UI has an input field R1 for selecting the folder (location in a hierarchical storage area) where image data for the static image G3 is stored, and selecting the image data for the static image G3 in the selected folder. Using a tool provided by the application AP, for example, the user previously creates and stores the image data for the static image G3 in an appropriate folder. The user then uses the input field R1 in the user interface UI to select the storage location of the image data used for the static image G3 and select the desired image data.

A selection field R2 for selecting the device driver used to register the image data of the static image G3 in the inkjet printer 5 is also disposed to the user interface UI. The selection field R2 in this embodiment is a pull-down menu that enables selecting one device driver from a group of multiple device drivers. In this example, the user selects the registration device driver DD1 (labelled the "device registration driver" in FIG. 7) in selection field R2.

A selection field R3 for selecting the device driver used to print the label image G1 is also provided in the user interface UI. The selection field R3 is also a pull-down menu, and enables selecting one device driver from a group of multiple device drivers. In this example, the user selects the device control driver DD2 (labelled the "device control driver" in FIG. 7) in selection field R3.

After inputting the selections in the user interface UI and confirming the input, the user instructs starting to print the label image G1 by a specific means.

As will be clear below, when the user inputs selections to the user interface UI and instructs starting to print, the image data for the static image G3 is registered and the label image G1 is repeatedly printed systematically without further human intervention.

Triggered by this command, the application execution unit 45d accesses the folder selected in the input field R1 of the user interface UI, and retrieves the image data for the static image G3 (step SA2). Next, the application execution unit 45d calls the device driver selected in the selection field R2 of the user interface UI (registration device driver DD1 in this example) using the API (step SA3).

Next, the application execution unit 45d outputs the image data acquired for the static image G3 (information related to a static image) through a specific API to the registration device driver DD1, and instructs printing the static image G3 (step SA4). The application AP thus applies a print command using an existing API to the registration device driver DD1 when registering image data for the static image G3 in the inkjet printer 5 in some embodiments of the invention. More specifically, data can be communicated between the application AP and the registration device driver DD1 using an existing API, and there is no need for a new specialized API for registering images.

When image data for the static image G3 is input, the registration device driver execution unit 45b generates a control command C1 including the image data of the static image G3 and instructing registering the image data (step SA5), and outputs the control command C1 to the inkjet printer 5 (step SA6).

More specifically, the registration device driver DD1 is a device driver including a function for generating and outputting a control command C1 instructing registering image data for the static image G3 when a command to print the static image G3 is asserted by the application AP through the API.

The printer control unit 27 of the inkjet printer 5 then receives the control command C1 (step SB1), and registers the static image G3 based on the control command C1 (step SB2).

More specifically, when the control command C1 is received, the printer control unit 27 extracts the image data for the static image G3 from the command in step SB2. The printer control unit 27 then stores the extracted image data for the static image G3 to a specific area in working memory created in RAM. Storing the image data for the static image G3 in working memory in this embodiment is an example of registering image data for the static image G3.

After outputting the control command C1 instructing registering image data for the static image G3, the application execution unit 45d calls and runs the device control driver DD2 using the API (step SA7). Calling the device control driver DD2 in this embodiment thus occurs without further human intervention after outputting the control command C1.

Next, the host computer 1 and inkjet printer 5 execute respective continuous printing processes (step SA8, step SB3).

Figure 8:
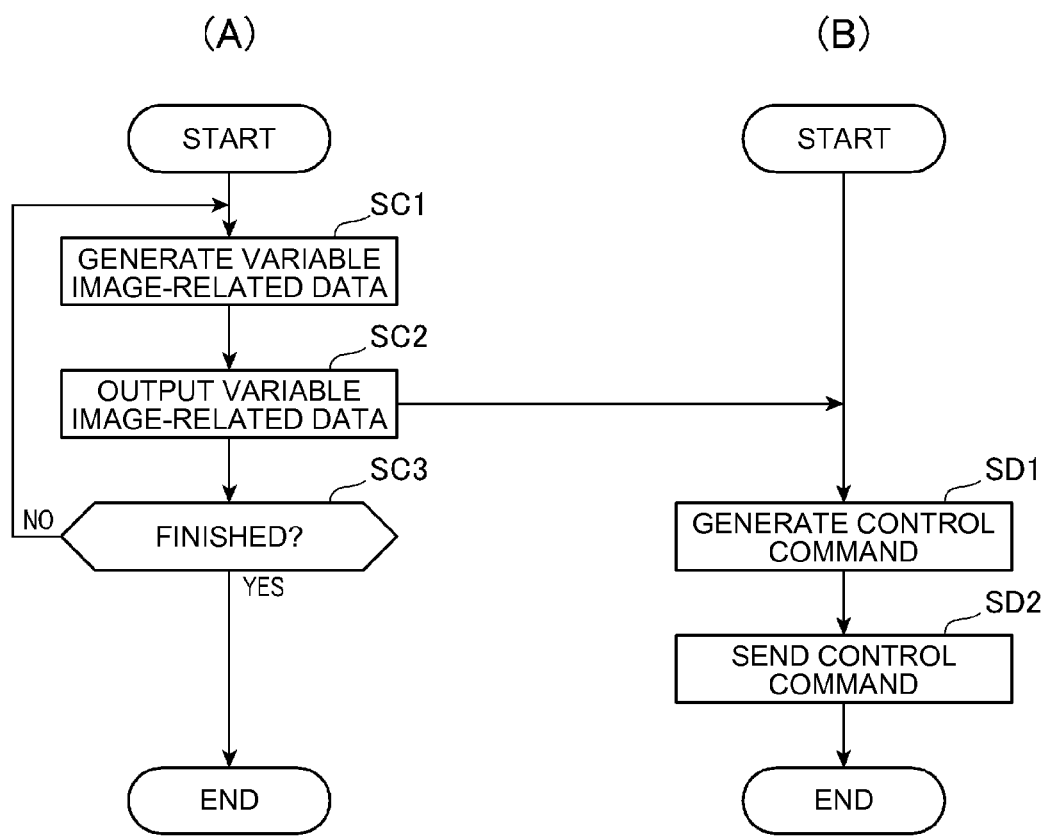
FIG. 8 is a flow chart describing the operation of the application and printer driver when printing consecutive label images.

FIG. 8 is a flow chart describing the operation of the application execution unit 45d and the device control driver execution unit 45c during the continuous printing process of step SA8, column (A) showing the operation of the application execution unit 45d, and (B) the operation of the device control driver execution unit 45c.

In the continuous printing process, the application execution unit 45d generates variable image-related data, which is information related to the variable image G2 that should be printed on a single label S (step SC1). The variable image-related data is described below. As described above, the variable image G2 in this embodiment includes an image related to a string representing the model name of the television (product) ("model string image" below); a barcode image of the barcode representing a code uniquely assigned to each television ("barcode image" below); and an image related to a string expressing the identification number uniquely assigned to each television ("identification number string image" below). The variable image-related data includes for each image at least information indicating where the image is to be printed, information indicating the type of image (string or barcode), and information indicating the content of the image. The information indicating the content of the image is a string representing the model name for the model string image, information indicating the barcode for the barcode image, and the string representing the identification number for the identification number string image.

The model name printed on the label S is the same for each label S, that is, XX-YYYY in this example. The code of the barcode is a serial number that is incremented 1 for each label S. The identification number is also a serial number that is incremented 1 for each label S. For example, if the barcode encodes the code 00001 and the identification number is the string 00001 on one label S, the barcode 00002 and the identification number string 00002 are printed on the next label S, and the barcode 00003 and the identification number string 00003 are then printed on the next label S. The user previously registers the rules for changing the barcode code and the identification number through a specific user interface. Alternatively, the user interface UI described could also be configured to enable inputting the rules, and the user can then input the rules using the user interface UI.

In step SC1, the application execution unit 45d calculates the barcode code and the identification number according to the rules registered by the user for changing the barcode and the identification number, and then generates the variable image-related data, which is the information related to the variable image G2 to be printed on one label S.

Next, the application execution unit 45d outputs the generated variable image-related data to the device control driver execution unit 45c (step SC2).

Next, the application execution unit 45d determines if generating and outputting the variable image-related data for all labels S to be printed with the label image G1 is completed (step SC3). If not completed (step SC3 returns NO), the application execution unit 45d returns to step SC1, and generates the variable image-related data for the variable image G2 to be printed on the next label S.

When variable image-related data is input from the application execution unit 45d, the device control driver execution unit 45c generates a control command C2 for superimposing the static image G3 and variable image G2 based on the input data (step SD1). Next, the device control driver execution unit 45c sends the generated control command C2 to the inkjet printer 5 (step SD2).

Operation of the inkjet printer 5 when this control command C2 is received (operation during the continuous printing process in step SB3) is described next.

When the control command C2 is received, the printer control unit 27 of the inkjet printer 5 writes the image data for the static image G3 stored in working memory to the print buffer (not shown in the figure) used for printing the label image G1. Next, the printer control unit 27 generates image data for the variable image G2 based on the control command C2, and writes the generated image data to the print buffer. At this time, the printer control unit 27 writes the image data for the variable image G2 so that it merges with the image data for the static image G3 already written to the print buffer. As a result, image data for a label image G1 containing both the static image G3 and the variable image G2 is compiled in the print buffer. Next, the printer control unit 27 controls the printing related mechanisms based on the image data written to the print buffer (the image data for the label image G1), and prints the label image G1 on a label S. As a result, a label image G1 combining the superimposed static image G3 and variable image G2 is printed on a label S.

As described above, when printing a label image G1 in a printing system 8 according to this embodiment, a static image G3 and a variable image G2 are merged to print the label image G1 on each label S instead of using label paper 14 that is previously printed with the static image G3 on each label S. As a result, there is no need to destroy label paper 14 and wasting label paper 14 can be prevented even when the design of the static image G3 changes. Frequent replacement of the label paper 14 can also be suppressed.

When printing a label image G1 on a label S in this embodiment, the following process is executed instead of the host computer 1 sending a control command instructing printing a label image G1 containing the static image G3 and the variable image G2 to the inkjet printer 5. Specifically, image data for the static image G3 is first registered in the inkjet printer 5 in this embodiment. The inkjet printer 5 then prints the static image G3 based on the previously stored (registered) image data for the static image G3, and based on the received control command C2, prints the variable image G2 superimposed with the static image G3. As a result, there is no need to send the image data for the static image G3 each time for each label S to print, and the data size of the control command C2 can be reduced. Because the data size of the control command C2 is small, efficient communication between the host computer 1 and inkjet printer 5 is possible, and the receive buffer of the inkjet printer 5 can effectively be prevented from overflowing.

The registration device driver DD1 and device control driver DD2 in this embodiment are separate device drivers.

A configuration in which the function for registering the static image G3 (function corresponding to the registration device driver DD1) and the function controlling printing (function corresponding to the device control driver DD2) are both embodied in a single device driver is conceivable. In this event, the device driver must be configured so that either function can be executed by changing the mode, and the application AP must be configured so that the device driver mode can be changed by asserting an appropriate command to the device driver. As a result, the application AP must be specifically programmed according to the specifications of the device driver, and the device driver must be programmed specifically for the application. Creating a special API may also be necessary. In other words, both the application and the device driver can become increasingly complex.

In some embodiments of the invention, however, the registration device driver DD1 and the device control driver DD2 are separate device drivers. As a result, the application AP can call the registration device driver DD1 to register a static image, and can call the device control driver DD2 to print, for example, using an API provided by the OS. More specifically, the application AP can register a static image G3 and print a label image G1 by changing the device driver that is called using an existing API, and complicating the application AP and the device driver can be suppressed.

As described above, a registration device driver DD1 and a device control driver DD2 are both installed to the host computer 1 in the printing system 8 (control system) according to some embodiments of the invention. The registration device driver DD1 has a function for generating and outputting a control command C1 instructing printing a static image G3 based on input of image data for the static image G3 from an application AP. The device control driver DD2 generates and outputs a control command C2 that controls printing a variable image G2 superimposed with the static image G3 based on input of information related to the variable image G2 from the application AP.

To repeatedly print the label image G1 to label paper 14, the application execution unit 45d calls the registration device driver DD1, and using a function of the driver generates and outputs the control command C1 to the inkjet printer 5. The application AP then calls the device control driver DD2, and through a function of this driver repeatedly executes a process of generating and sending control command C2 to the inkjet printer 5.

Based on the control command C1, the inkjet printer 5 registers (stores) the static image G3, and when a control command C2 is then received, prints the variable image G2 superimposed with the registered static image G3 on a label S of the label paper 14 based on the control command C2.

With this configuration there is no need to destroy label paper 14 and wasting label paper 14 can be prevented even when the design of the static image G3 changes. Frequent replacement of the label paper 14 can also be suppressed.

This configuration also enables the application AP to register a static image G3 and print an image by changing the device driver using an existing API as described above, and complicating the application AP and device driver can be prevented.

When a label image G1 is repeatedly printed on label paper 14 in this embodiment, the application execution unit 45d first calls the registration device driver DD1, and using a function of the device driver registers the static image G3 in the inkjet printer 5. Next, the application AP calls the device control driver DD2, and using a function of the device driver repeatedly executes a process of generating and outputting a control command C2 instructing printing the static image G3 registered in the inkjet printer 5 superimposed with a variable image G2.

The application AP, registration device driver DD1, and device control driver DD2 cooperate in this configuration without human intervention to automatically repeatedly print the label image G1, and user convenience is excellent.

Some embodiments of the invention also provide a user interface UI for selecting the registration device driver DD1 and the device control driver DD2 for repeatedly printing label images G1 on label paper 14.

This configuration enables accurately specifying the registration device driver DD1 and the device control driver DD2 for the application AP.

Other Embodiments

Some embodiments of the invention are described below.

The application AP in the above embodiment calls a registration device driver DD1 and a device control driver DD2. In the example described below, the API calls these device drivers to execute a process.

While not shown in the figures, the host control unit 45 in this example also has an API execution unit 45e as a function block that executes a process by reading and running an API.

FIG. 9 is a flow chart of the operation of the host computer 1 and the inkjet printer 5 when repeatedly printing label image G1 to the label paper 14.

FIG. 9 (A) illustrates the operation of the application execution unit 45d of the host computer 1, (B) the operation of the API execution unit 45e, (C) the operation of the registration device driver execution unit 45b, (D) the operation of the device control driver execution unit 45c, and (E) the operation of the inkjet printer 5.

As shown in FIG. 9 (A), to print the label image G1 repeatedly, the user first commands displaying the user interface UI. The application execution unit 45d then displays the user interface UI on the display panel (step SE1).

As described above, the user interface UI enables selecting where the image data for the static image G3 is stored, the device driver for registering the image data, and the device driver that controls printing. The user interface UI could also be configured to enable inputting the rules related to the variable image G2.

The user inputs the necessary information to the user interface UI, and commands starting to print.

In this example, the user selects the registration device driver DD1 as the device driver for registering image data, and the device control driver DD2 as the device driver for controlling printing.

The application execution unit 45d then calls a specific API ("corresponding API" below) (step SE2), and outputs the information input to the user interface UI to the corresponding API (step SE3).

The API execution unit 45e is a function block that reads and runs the corresponding API.

As shown in FIG. 9 (B), the API execution unit 45e calls the registration device driver DD1 (step SF1).

Next, the API execution unit 45e outputs information including the information identifying the storage location of the image data for the static image G3 to the registration device driver DD1 (step SF2).

As shown in FIG. 9 (C), the registration device driver execution unit 45b generates and sends a control command C1 instructing registering the image data for the static image G3 to the inkjet printer 5 (step SG1).

As shown in FIG. 9 (E), the printer control unit 27 of the inkjet printer 5 registers the static image G3 based on the control command C1 when the control command is received (step SI1).

As shown in FIG. 9 (B), the API execution unit 45e then calls the device control driver DD2 (step SF3).

Next, the API execution unit 45e outputs information required for the continuous printing process, including the rules related to the variable image G2, to the device control driver DD2 (step SF4).

AS shown in FIG. 9 (D) and FIG. 9 (E), the device control driver execution unit 45c and the inkjet printer 5 execute the continuous printing process (step SH1, step SI2).

Some embodiments of the invention can therefore achieve the same effect as the embodiment described above when the API calls the device driver for registering image data and the device driver for controlling printing to execute a continuous process. The API that calls the registration device driver DD1 could also be an API supplied by the operating system.

Some embodiments of the invention are described above with reference to a preferred embodiment thereof, but some embodiments of the invention are not limited thereto and can be modified and adapted in many ways without departing from the scope of the accompanying claims.

For example, the configuration of the label image G1 shown in FIG. 4 is only an example. More specifically, the label image G1 conceptually includes any image combining a static image G3 and a variable image G2. In the foregoing embodiments, the variable image G2 is an image of content that changes according to specific rules of change, and the rules of change are not limited to those described above. The image data of the variable image G2 could also be prepared in advance for each label S.

The function blocks shown in FIG. 3 can also be desirably achieved by the cooperation of hardware and software, and do not suggest a specific hardware configuration. Functions of the host computer 1 and inkjet printer 5 could also be rendered by separate devices externally connected thereto. The host computer 1 and inkjet printer 5 could also operate as described above by executing a program stored to an externally connected storage medium.

The disclosure being thus described, it will be apparent that it may be varied in many ways. Such variations are not to be regarded as a departure from the spirit and scope of the disclosure, and all such modifications as would be apparent to one skilled in the art are intended to be included within the scope of the following claims.

What is claimed is:

1. A control device connected to a printing device capable of repeatedly printing an image on recording media, wherein:
the image includes a variable image that can be changed in each repeatedly printed image, and a static image that is the same in each repeatedly printed image, and the control device comprises:
a registration device driver execution unit that runs a registration device driver with the ability to instruct registering the static image on the printing device; and
a device control driver execution unit that runs a device control driver with the ability to instruct printing the variable image superimposed with the static image registered in the printing device;
the registration device driver execution unit generating and outputting to the printing device a control command instructing registering the static image based on input of information related to the static image, and
the device control driver execution unit generating and outputting to the printing device a control command instructing printing the variable image superimposed with the static image registered in the printing device based on input of information related to the variable image,
wherein the control device provides a user interface to select the registration device driver and the device control driver when repeatedly printing the image on the recording medium.

2. The control device described in claim 1, wherein:
the registration device driver execution unit generates and outputs to the printing device a control command instructing registering the static image in the printing device based on input of information related to the static image from a specific program; and
the device control driver execution unit generates and outputs to the printing device a control command instructing printing the variable image superimposed with the static image registered in the printing device based on input of information related to the variable image from the specific program.

3. The control device described in claim 2, wherein:
the specific program is an application programming interface (API) that is called by an application and handles data input/output between the application and a device driver.

4. The control device described in claim 2, wherein:

when repeatedly printing the image on the recording medium, the registration device driver execution unit is called by the specific program, and generates and outputs to the printing device a control command instructing registering the static image in the printing device based on input of information related to the static image from the specific program; and the device control driver execution unit is called by the specific program, and generates and outputs to the printing device a control command instructing printing the variable image superimposed with the static image registered in the printing device based on input of information related to the variable image from the specific program.

5. The control device described in claim 1, wherein:

the specific program is an application capable of outputting information related to an image to print on a recording medium.

6. A control system comprising a printing device capable of repeatedly printing an image on recording media, and a control device connected to the printing device, wherein:

the image includes a variable image that can be changed in each repeatedly printed image, and a static image that is the same in each repeatedly printed image;

the control device includes a registration device driver execution unit that runs a registration device driver with the ability to instruct registering the static image on the printing device, and generates and outputs to the printing device a control command instructing registering the static image based on input of information related to the static image, and a device control driver execution unit that runs a device control driver with the ability to instruct printing the variable image superimposed with the static image registered in the printing device, and generates and outputs to the printing device a control command instructing printing the variable image superimposed with the static image registered in the printing device based on input of information related to the variable image; and the printing device includes a control unit that registers the static image based on a control command instructing registering the static image, and prints the registered static image superimposed with the variable image on the recording medium when a control command instructing printing the static image superimposed with the variable image is received, wherein the control device provides a user interface to select the registration device driver and the device control driver when repeatedly printing the image on the recording medium.

7. The control system described in claim 6, wherein:

the registration device driver execution unit generates and outputs a control command instructing registering the static image in the printing device based on input of information related to the static image from a specific program; and the device control driver execution unit generates and outputs to the printing device a control command instructing printing the variable image superimposed with the static image registered in the printing device based on input of information related to the variable image from the specific program.

8. The control system described in claim 6, wherein:

the specific program is an application capable of outputting information related to an image to print on a recording medium.

9. The control system described in claim 6, wherein:

the specific program is an application programming interface (API) that is called by an application and handles data input/output between the application and a device driver.

10. The control system described in claim 6, wherein:

when repeatedly printing the image on the recording medium, the registration device driver execution unit of the control device is called by the specific program, and generates and outputs to the printing device a control command instructing registering the static image in the printing device based on input of information related to the static image from the specific program; and the device control driver execution unit is called by the specific program, and generates and outputs a control command instructing printing the variable image superimposed with the static image registered in the printing device based on input of information related to the variable image from the specific program.

* * * * *